(12) United States Patent
Mooney

(10) Patent No.: US 12,511,367 B2
(45) Date of Patent: Dec. 30, 2025

(54) DYNAMIC USER INTERFACES FOR AUTHENTICATION

(71) Applicant: Comcast Cable Communications, LLC, Philadelphia, PA (US)

(72) Inventor: Philip D. Mooney, Sellersville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 679 days.

(21) Appl. No.: 15/886,619

(22) Filed: Feb. 1, 2018

(65) Prior Publication Data

US 2019/0236258 A1 Aug. 1, 2019

(51) Int. Cl.
  *G06F 21/36* (2013.01)
  *G06F 3/0482* (2013.01)
  *H04L 9/32* (2006.01)

(52) U.S. Cl.
  CPC ............ *G06F 21/36* (2013.01); *G06F 3/0482* (2013.01); *H04L 9/3226* (2013.01); *G06F 2221/2103* (2013.01)

(58) Field of Classification Search
  CPC .......... G06F 21/30; G06F 21/31; G06F 21/36; G06F 21/45; G06F 21/46; G06F 21/60; G06F 21/62
  USPC ......................................................... 726/19
  See application file for complete search history.

(56) References Cited

U.S. PATENT DOCUMENTS

| | | | |
|---|---|---|---|
| 8,520,848 B1 | 8/2013 | Liu et al. | |
| 10,540,492 B1* | 1/2020 | Norris, III | G06F 21/36 |
| 2008/0066167 A1* | 3/2008 | Andri | G06F 21/31 726/5 |
| 2009/0037986 A1* | 2/2009 | Baker | G06F 21/31 726/5 |
| 2009/0044282 A1 | 2/2009 | Govindaraju | |
| 2010/0287382 A1* | 11/2010 | Gyorffy | H04L 63/083 713/185 |
| 2014/0223191 A1* | 8/2014 | Tadokoro | H04L 9/0866 713/186 |
| 2015/0235018 A1* | 8/2015 | Gupta | G06F 21/36 726/19 |
| 2015/0319159 A1* | 11/2015 | Abdul Hameed Khan | H04W 12/065 726/7 |
| 2016/0041929 A1* | 2/2016 | Federspiel | G06F 21/44 713/193 |
| 2017/0063393 A1* | 3/2017 | Shelton | G06F 3/0233 |
| 2017/0200003 A1* | 7/2017 | Zaver | H04L 9/0656 |

(Continued)

FOREIGN PATENT DOCUMENTS

| | | |
|---|---|---|
| CN | 2751351 Y | 1/2006 |
| CN | 203616759 U | 5/2014 |

(Continued)

OTHER PUBLICATIONS

NPL Search Terms (Year: 2025).*

*Primary Examiner* — Syed A Zaidi
(74) *Attorney, Agent, or Firm* — Ballard Spahr LLP

(57) ABSTRACT

Disclosed are systems and methods for dynamic user interfaces for authentication. A user interface comprising a plurality of user interface elements can be generated. The plurality of user interface elements can be generated according to a random placement. The each plurality of user interface elements can comprise a random plurality of attribute values.

20 Claims, 6 Drawing Sheets

(56) References Cited

U.S. PATENT DOCUMENTS

2017/0244554 A1* 8/2017 Feliciano .............. H04L 9/0869
2017/0300159 A1* 10/2017 Akiyoshi ................ G06F 21/31

FOREIGN PATENT DOCUMENTS

| KR | 20040056273 A | 6/2004 |
| KR | 20040107454 A | 12/2004 |

* cited by examiner

| Background Pattern | | Shape | | | Color | | Letter | |
|---|---|---|---|---|---|---|---|---|
| 10 | Solid | 20 | Star | ★ | 30 | Red | 40 | A |
| 11 | Rain | 21 | Moon | ☾ | 31 | Yellow | 41 | B |
| 12 | River | 22 | Box | ▢ | 32 | Blue | 42 | C |
| 13 | Up Stream | 23 | Log | | 33 | Green | 43 | D |
| 14 | Down Stream | 24 | Drum | | 34 | Purple | 44 | E |
| 15 | Hollow | 25 | Smiley | ☺ | 35 | Pink | 45 | F |
| 16 | Fog | 26 | Cloud | ☁ | 36 | Orange | 46 | G |
| 17 | Ocean | 27 | Plus | ✚ | 37 | Black | 47 | H |
| 18 | High Tide | 28 | Diamond | ◆ | 38 | Brown | 48 | I |
| 19 | Low Tide | 29 | Heart | ♥ | 39 | Gray | 49 | J |

FIG. 2

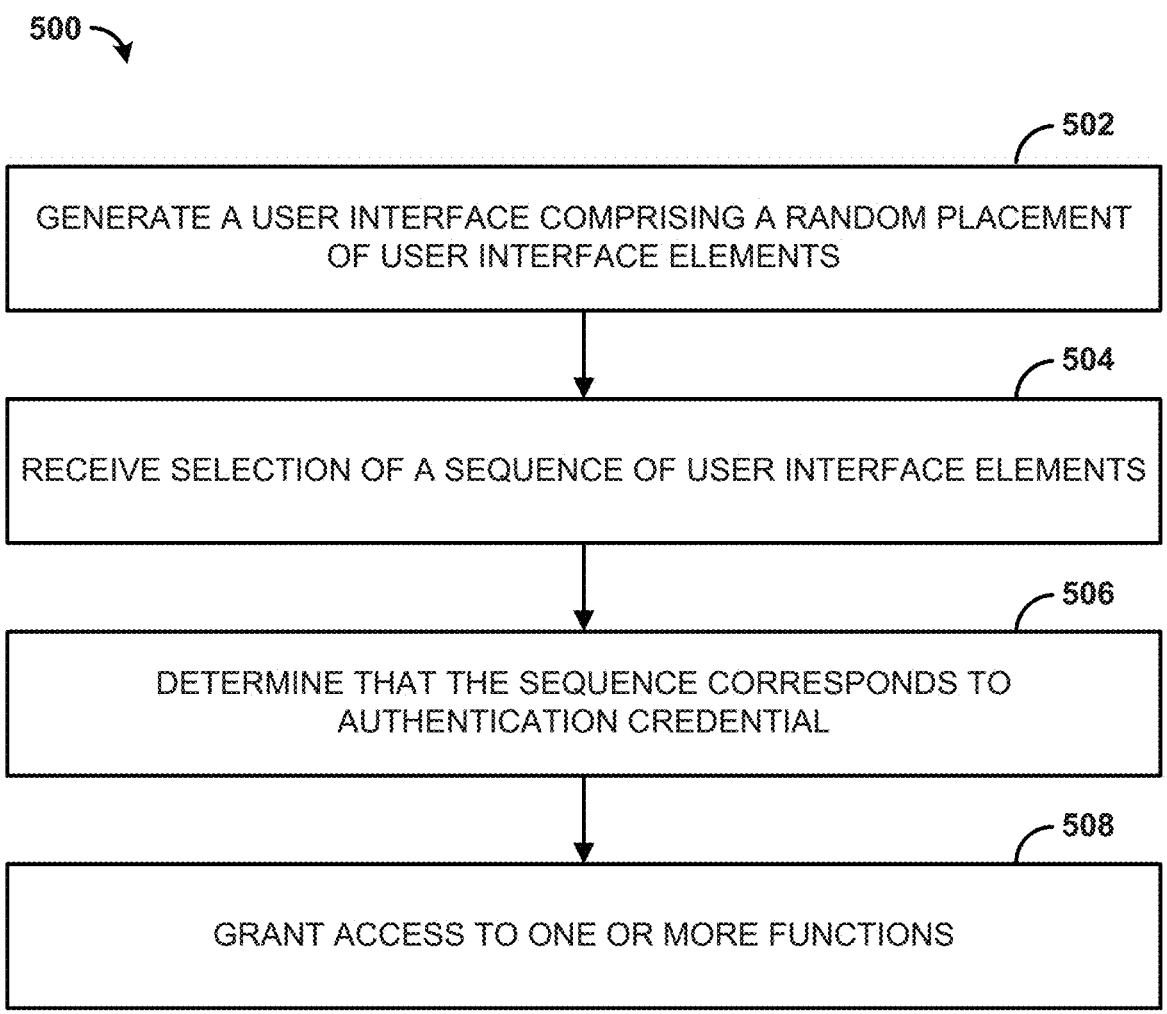

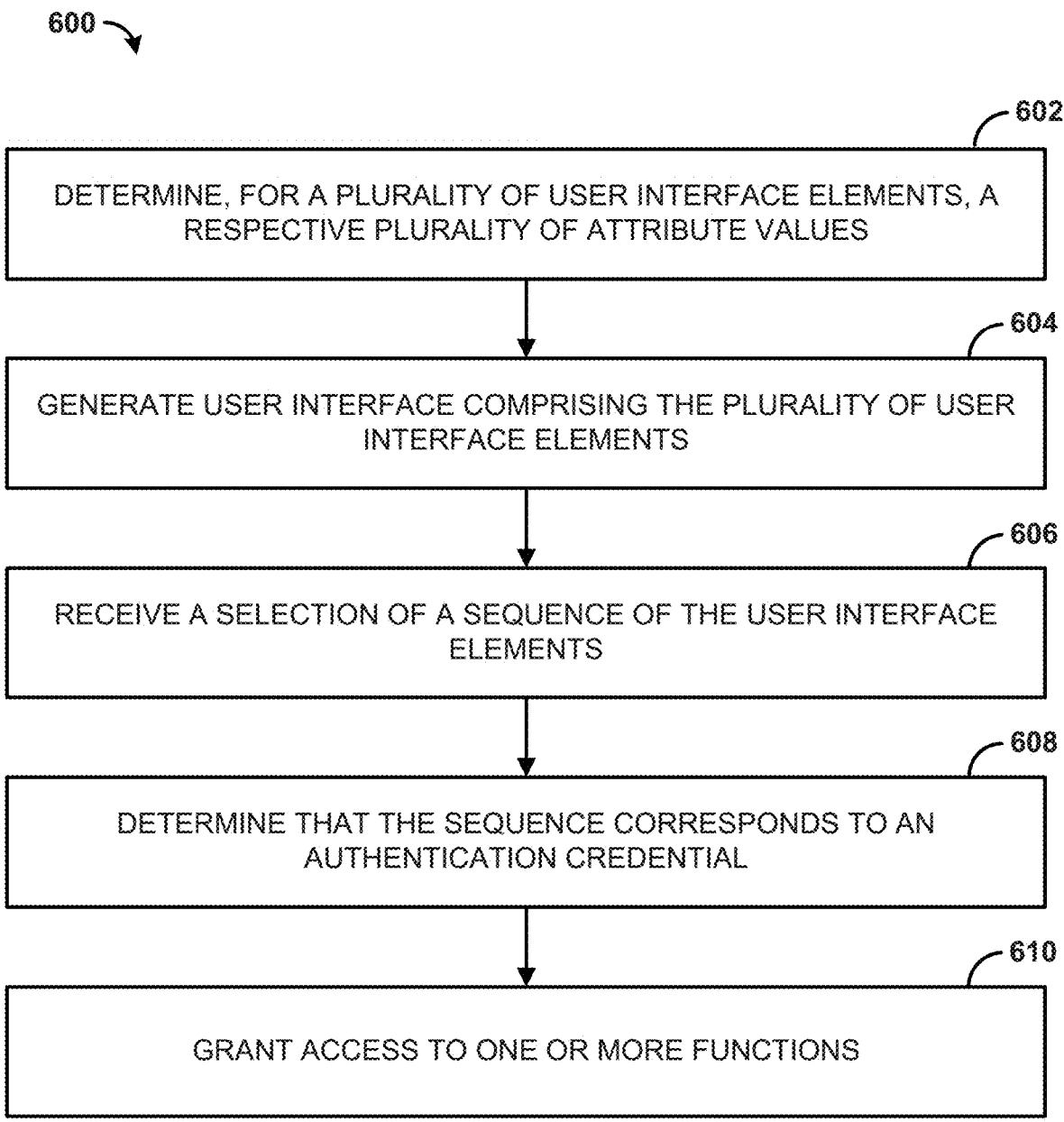

DYNAMIC USER INTERFACES FOR AUTHENTICATION

BACKGROUND

Devices such as mobile devices implement a "locked" state that restricts access to functions of the device. The devices can be "unlocked" by inputting an authentication credential, such as a predefined sequence of characters and/or numbers. However, the user interface for inputting this authentication credential is identical each time a user attempts to "unlock" the device. This can allow an observer to determine the authentication credential for later access to the device. These and other shortcomings are addressed by the approaches set forth herein.

SUMMARY

It is to be understood that both the following general description and the following detailed description are exemplary and explanatory only and are not restrictive. Provided are methods and systems for dynamic authentication credential input. A user device can present a user interface for inputting an authentication credential to access functionality of the user device. For example, the user device can present a user interface including a keyboard or number pad to input a password or a number. The user device can generate the user interface by randomly determining an order or placement of the keys used to input the authentication credential. Thus, the locations of the keys used to input the authentication credential will change across each attempt to access the user device.

As another example, each key of the user interface can include multiple attributes, such as a number, a letter, a background pattern, a color, and/or a shape. The particular attributes for each key can be determined at least partially randomly, e.g. random selection from a plurality of attribute values without replacement. The particular authentication credential can include a sequence of attributes, e.g., a shape, a number, a color, and a background pattern. As a key used to select a given attribute for the authentication credential has multiple attributes assigned to it, an observer will not know for which attribute the particular key was selected. Additionally, as the user interface is randomly generated, the locations of the keys used to input the authentication credential will change across each attempt to access the user device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is an example table of a numerical encoding of attribute values;

FIG. 5 is a flowchart of an example method; and

FIG. 6 is a flowchart of an example method.

DETAILED DESCRIPTION

Figure 1:
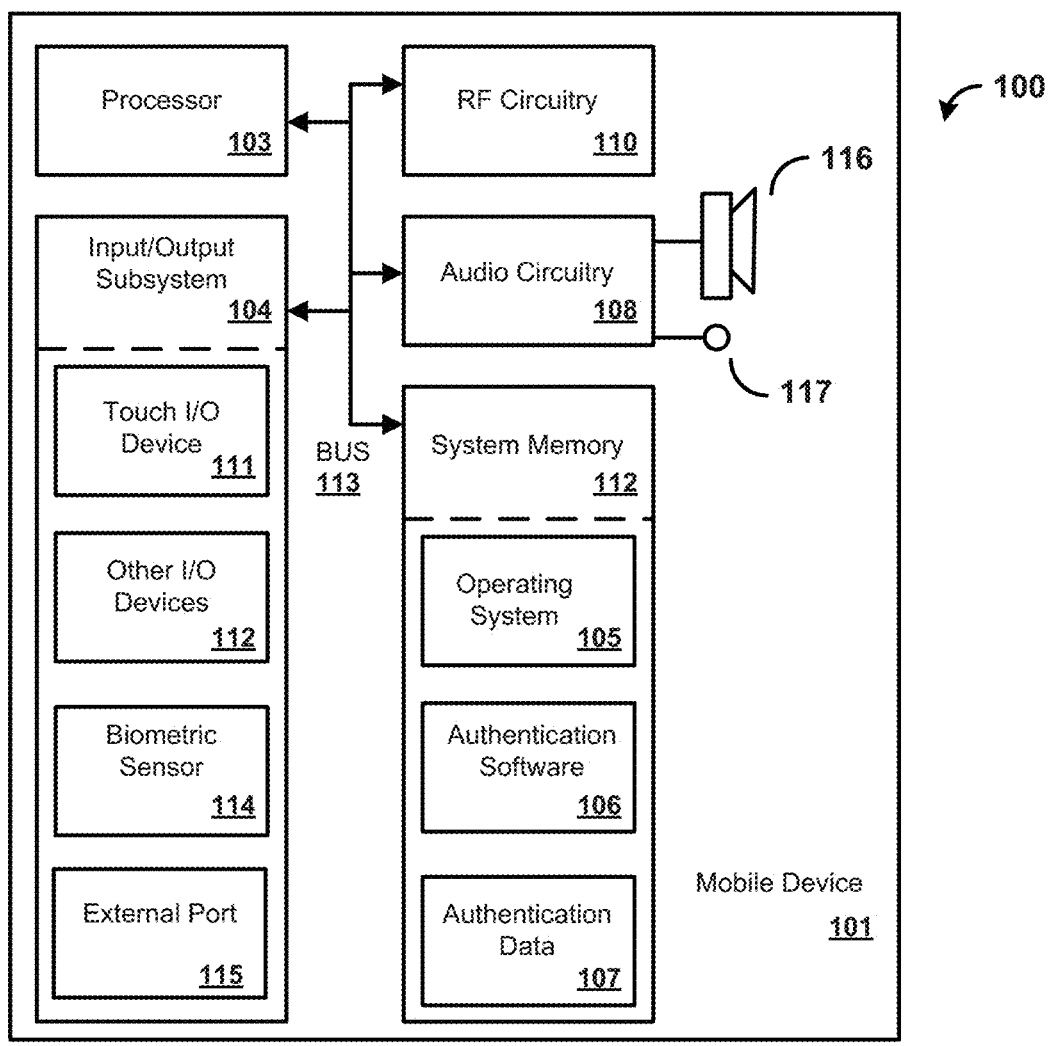
FIG. 1 is a block diagram of an example computing device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

This disclosure relates generally to entering a passcode into a device to unlock/access the device. The layout or arrangement of the soft keys/buttons on a device is dynamically changed. In this manner, a user entering a passcode will always have to enter it in a different pattern by pressing buttons in different locations, thereby preventing someone from learning the passcode by simply watching or recording a user entering the passcode.

Mobile devices store valuable information and often contain credentials to access valuable online services such as bank accounts, financial services, digital cash, and health care data. The greater the value of the information available through the device, the more important identity verification is to prevent theft and undesired disclosure of information. Similarly computer programs and set-top boxes require identity verification to access valuable content.

Many electronic devices are secured using a 4 digit PIN or similar code or a pattern to unlock the device. There are numerous ways available for attackers to steal that code in order to gain access to the device. A few of the ways are: watching the screen during code entry, recording code entry via a security camera, running malware to monitor device during code entry, thermal imaging after code entry, observing from a distance the relative motion of where keys are pressed and even by inspecting the grease smears left on the device's glass display. Keys are presented in the same location every time and so repeating those presses can be trivial.

Current access codes are often short numbers entered on the keypad or screen or a pattern drawn on the screen. More secure access codes are longer passwords containing letters, numbers, and special characters—which is impractical for quick access to a small device without a keyboard.

This invention offers a more secure method of accessing a device by displaying the key layout on the screen in a way that changes every time and has enough overlapping information that even a direct observer would not be able to easily replicate it on subsequent attempts due to the multiplicity of attributes for each key. This creates a dynamic passcode that changes what keys are entered each time.

Users who greatly value the information on their phones and the additional access they provide need a more secure method to lock out unwanted users that is still easy to use and difficult for an attacker to replicate. In this disclosure the term "attacker" refers to anyone wishing to gain unauthorized access to the user interface of the phone or other device.

By presenting to the user a keypad that displays multiple attributes on each key rather than a single number, the attacker cannot determine what the underlying passcode is. On the next attempt, the keys and attributes would be randomly changed so pressing the same keys again would not produce the correct passcode.

The present disclosure relates to dynamic generation of user interfaces for authentication. User devices such as mobile devices can implement a "locked" state. In the locked state, access to the functions of the user device is limited, if not wholly blocked. Typically, when an attempt is made to unlock the user device, e.g. a power or "home" button is pressed, the user device will present a user interface for inputting an authentication credential such as a number or password. The user interface can include a keyboard and/or a number pad with a standardized placement of keys. This creates several disadvantages. As an example, a malicious party can watch a user input the authentication credential. The malicious party can then see which keys are pressed, thereby knowing the authentication credential. If the particular keys cannot be identified, the malicious party can determine a general location on the keyboard that was pressed, increasing the likelihood of correctly guessing or determining the authentication credential. As another example, use of the user interface can result in smudges or hit signatures which can be used to identify which keys were pressed during authentication. Thus, the use of a standardized keyboard and/or number pad creates a risk of exposing the authentication credential used to unlock the device.

A dynamically arranged user interface for inputting authentication credentials into a device can mitigate the risks of a malicious observer determining the authentication credential used to authenticate the device. For example, the user interface can comprise a keyboard or number pad, but with the placement and/or order of the keys being randomly generated. As another example, each key can comprise multiple attributes, e.g., a color, a number/letter, a background pattern and/or a shape. The authentication credential can comprise a sequence of attribute values, e.g, a particular shape, a particular background pattern, a particular letter, and a particular color. The attribute values for a given key can be determined at least partially randomly. For example, the attribute values for a given key can be randomly selected from a plurality of possible attribute values with or without replacement. Thus, as a given key corresponds to multiple attribute values, an observer cannot determine which attribute value is being entered for the authentication credential.

The methods and systems can be implemented on a computer 101 as illustrated in FIG. 1 and described below. Similarly, the methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors 103, a system memory 112, and a system bus 113 that couples various system components including the one or more processors 103 to the system memory 112. The system can utilize parallel computing.

The system bus 113 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the one or more processors 103, a mass storage device 104, an operating system 105, authentication software 106, authentication data 107, a network adapter 108, the system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as the authentication data 107 and/or program modules such as the operating system 105 and the authentication software 106 that are immediately accessible to and/or are presently operated on by the one or more processors 103.

In another aspect, the computer 101 can also comprise other removable/non-removable, volatile/non-volatile computer storage media. By way of example, FIG. 1 illustrates the mass storage device 104 which can provide non-volatile storage of computer code, computer readable instructions, data structures, program modules, and other data for the computer 101. For example and not meant to be limiting, the mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, the operating system 105 and the authentication software 106. Each of the operating system 105 and the authentication software 106 (or some combination thereof) can comprise elements of the programming and the authentication software 106. The authentication data 107 can also be stored on the mass storage device 104. The authentication data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 103 via the human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, the display device 111 can also be connected to the system bus 113 via an interface, such as the display adapter 109. It is contemplated that the computer 101 can have more than one display adapter 109 and the computer 101 can have more than one display device 111. For example, the display device 111 can be a monitor, an LCD (Liquid Crystal Display), or a projector. In addition to the display device 111, other output peripheral devices can comprise components such as speakers (not shown) and a printer (not shown) which can be connected to the computer 101 via the Input/Output Interface 110. Any step and/or result of the methods can be output in any form to an output device. Such output can be any form of visual representation, including, but not limited to, textual, graphical, animation, audio, tactile, and the like. The display device 111 and computer 101 can be part of one device, or separate devices.

The computer 101 can operate in a networked environment using logical connections to one or more remote computing devices 114a,b,c. By way of example, a remote computing device can be a personal computer, portable computer, smartphone, a server, a router, a network computer, a peer device or other common network node, and so on. Logical connections between the computer 101 and a remote computing device 114a,b,c can be made via a network 115, such as a local area network (LAN) and/or a general wide area network (WAN). Such network connections can be through the network adapter 108. The network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the one or more processors 103 of the computer. An implementation of the authentication software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

As an example, the computer 101 can comprise a user device such as a mobile device. The user device can implement a "lock" feature, whereby one or more functions of the user device are restricted. For example, access to applications or files on the user device can be restricted from access until an authentication credential is input to the user device, thereby "unlocking" the user device. In response to an input to the user device, e.g., a button press or voice command, the user device can generate a user interface that is displayed via the display device 111. The user interface can include a plurality of user interface elements, e.g. a keyboard or number pad with a plurality of keys. The user interface can facilitate the input of an authentication credential to unlock the user device.

As an example, the user interface can comprise a number pad or keyboard. Each of the keys can correspond to an alphanumeric character and/or symbol as can be appreciated. Accordingly, generating the user interface can comprise generating a random ordering, placement, or arrangement of the keys. For example, the user interface can comprise a number pad with keys corresponding to digits 0-9. Unlike existing approaches where the keypad is generated with a standardized arrangement of the keys (e.g., ascending order of keys 1-9 and an ending 0), the keypad can be generated with a random arrangement of keys. As another example, the user interface can comprise a keyboard with keys corresponding to alphanumeric characters and/or special characters. Unlike existing approaches where the keyboard is generated with a standard arrangement (e.g., QWERTY, DVORAK, alphabetic), the keyboard can be generated with a random arrangement of keys.

The user device can then receive a selection of a sequence of keys. The sequence of keys can be compared to the authentication credential. If the characters and/or numbers corresponding to the sequence match the authentication credential, access to one or more functions of the user device can be granted. In other words, the user device can be "unlocked." If the characters and/or numbers corresponding to the sequence fail to match the authentication credential, the user interface can be regenerated.

As another example, the user interface can comprise a plurality of user interface elements. Each of the user interface elements can comprise a plurality of attribute values, with each of the attribute values for a given user interface element corresponding to a distinct attribute of a plurality of attributes. For example, the plurality of attributes can comprise a color, a shape, a letter, a number, a background pattern, a rotation or movement, or other attribute as can be appreciated. Thus, the plurality of attribute values for a given user interface element can comprise two or more of a given color, a given shape, a given letter, etc. In such an example, generating the user interface can comprise determining, for each of the user interface elements, an attribute value for each of the plurality of attributes. Determining an attribute value can comprise selecting the attribute value from a plurality of possible attribute values for the given attribute. For example, determining a letter attribute for a given key can comprise selecting a letter from a predefined collection of letters. As another example, determining a color attribute can comprise selecting a color from a predefined selection of colors. Determining an attribute value can comprise determining the attribute value randomly. For example, an attribute value can be selected randomly from a plurality of possible attribute values with replacement, such that each user interface element corresponds to a different attribute value for the given attribute.

The user device can then receive a selection of a sequence of user interface elements. The user device can then determine if the sequence corresponds to an authentication credential. For example, the authentication credential can comprise a sequence of attribute values, e.g. a particular color, a particular shape, a particular letter, and a particular background pattern. As an example, an authentication credential can comprise the sequence "red, star, A, vertical stripes," with "red" being the particular color, "star" being the particular shape, "A" being the particular letter, and "vertical stripes" being the particular background pattern. For a sequence of user interface elements to correspond to this authentication credential, the first selected user interface element must have a "red" color attribute, the second selected user interface element must have a "star" shape attribute, the third selected user interface element must have a "A" letter attribute, and the fourth selected user interface element must have a "vertical stripes" background pattern attribute.

The attribute values can be stored in the user device as a numerical encoding. The numerical encoding can be unique for each attribute value and unique with respect to other attributes. Accordingly, the user device can determine if the sequence corresponds to an authentication credential by comparing a numerical encoding of each attribute value in the authentication credential to the corresponding numerical encoding of the input attribute values in the sequence. Encoding need not be limited to numerical but could be any internal representation that allows randomization and comparing of selected attributes, such as character based.

The user device can, in response to the sequence corresponding to the authentication credential, grant access to one or more functions of the user device, thereby "unlocking" the user device. The user device can, in response to the sequence not corresponding to the authentication credential, regenerate the user interface.

FIG. 2 is a table 200 of an example numerical encoding for attribute values. In this example, the table 200 includes four columns each corresponding to a respective attribute. Column 202 corresponds to the "background pattern" attribute. Column 204 corresponds to the "shape" attribute. Column 206 corresponds to the "color" attribute. Column 208 corresponds to the "letter" attribute. Each entry in a column corresponds to an attribute value for the respective attribute. For example, the "fog" background pattern attribute has a numerical encoding of 16. As another example, the "heart" shape attribute has a numerical encoding of 29. Columns 202 and 204 also include descriptors for the corresponding attribute values. Realizing that an ever changing user interface adds some complexity to the process of unlocking the device, these elements are designed to have simple and memorable names to improve ease of remembering the code. Thus "slanted up wavy lines" becomes "high tide," etc.

An authentication credential can be stored according to the numerical encodings of its attribute values. For example, an authentication credential comprising four attribute values can be stored as a four-byte array, with each byte corresponding to a respective attribute value. An example authentication credential "solid, moon, blue, D" can be stored as an ordered sequence of values {10, 21, 32, 43}. To authenticate an input sequence of selected user interface elements, a numerical encoding for each attribute value in each of the selected user interface elements can be determined. It can then be determined whether the numerical encoding of each attribute value in the authentication credential is represented in the numerical encodings for the corresponding selected user interface elements. For example, given the authentication credential having the numerical encoding {10, 21, 32, 43}, it can be determined whether the first selected user interface element includes a "10" numerical encoding, whether the second selected user interface element includes a "21" numerical encoding, whether the third selected user interface element includes a "32" numerical encoding, and whether the fourth selected user interface element includes a "43" numerical encoding.

Figure 3:
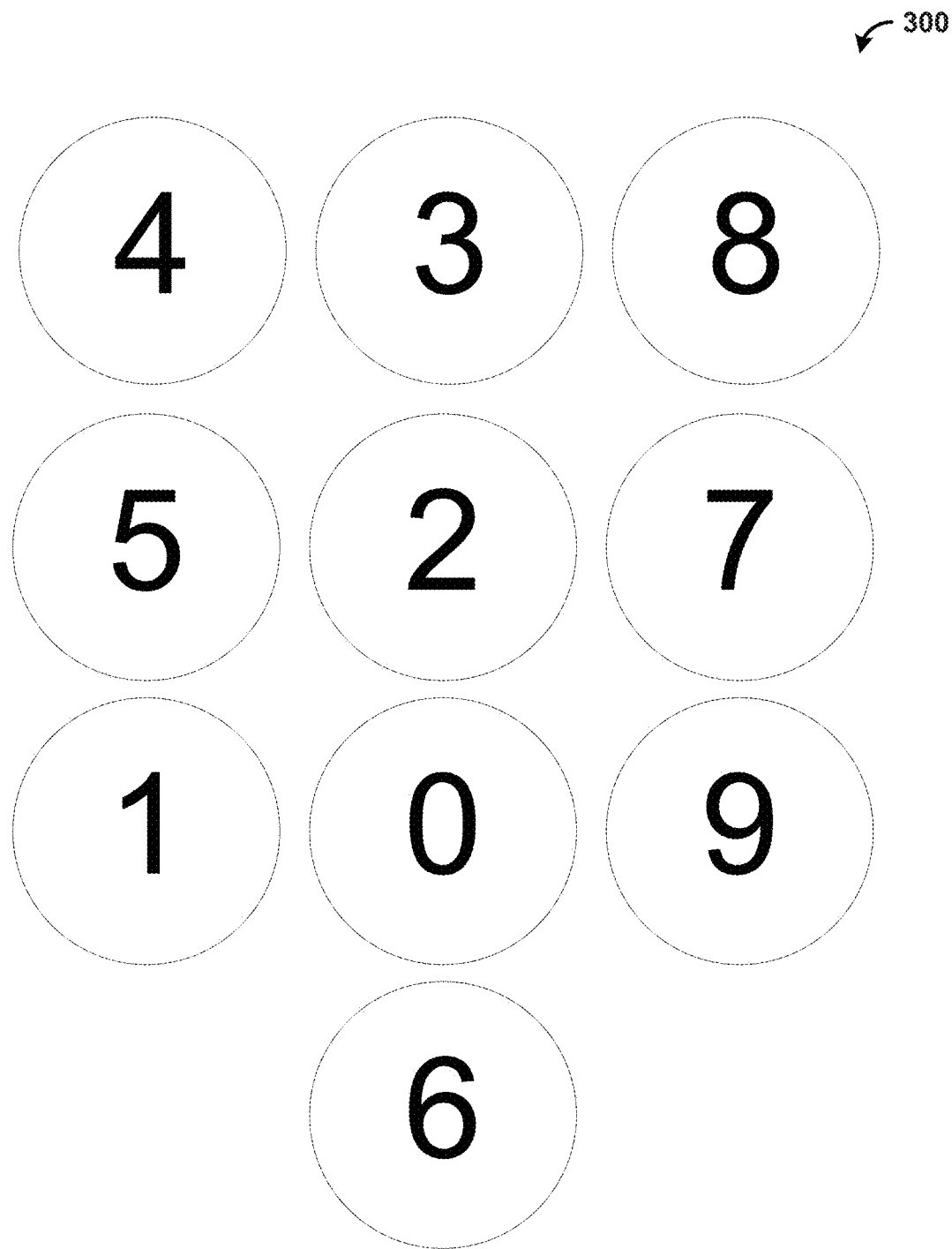
FIG. 3 is an example user interface.

FIG. 3 is an example user interface 300. The user interface 300 corresponds to a number pad having keys (user interface elements) corresponding to digits 0-9. However, the user interface 300 has been generated such that the keys have been randomly placed (e.g., by a computer 101). For example, the "4" key is placed in the left-most portion of the top row, which would typically be occupied by the "1" key. The user interface 300 can be generated such that the keys are randomly placed after each attempt to unlock a corresponding device. For example, entry of an incorrect authentication credential can cause the user interface 300 to be regenerated, thereby rearranging each of the keys.

Figure 4:
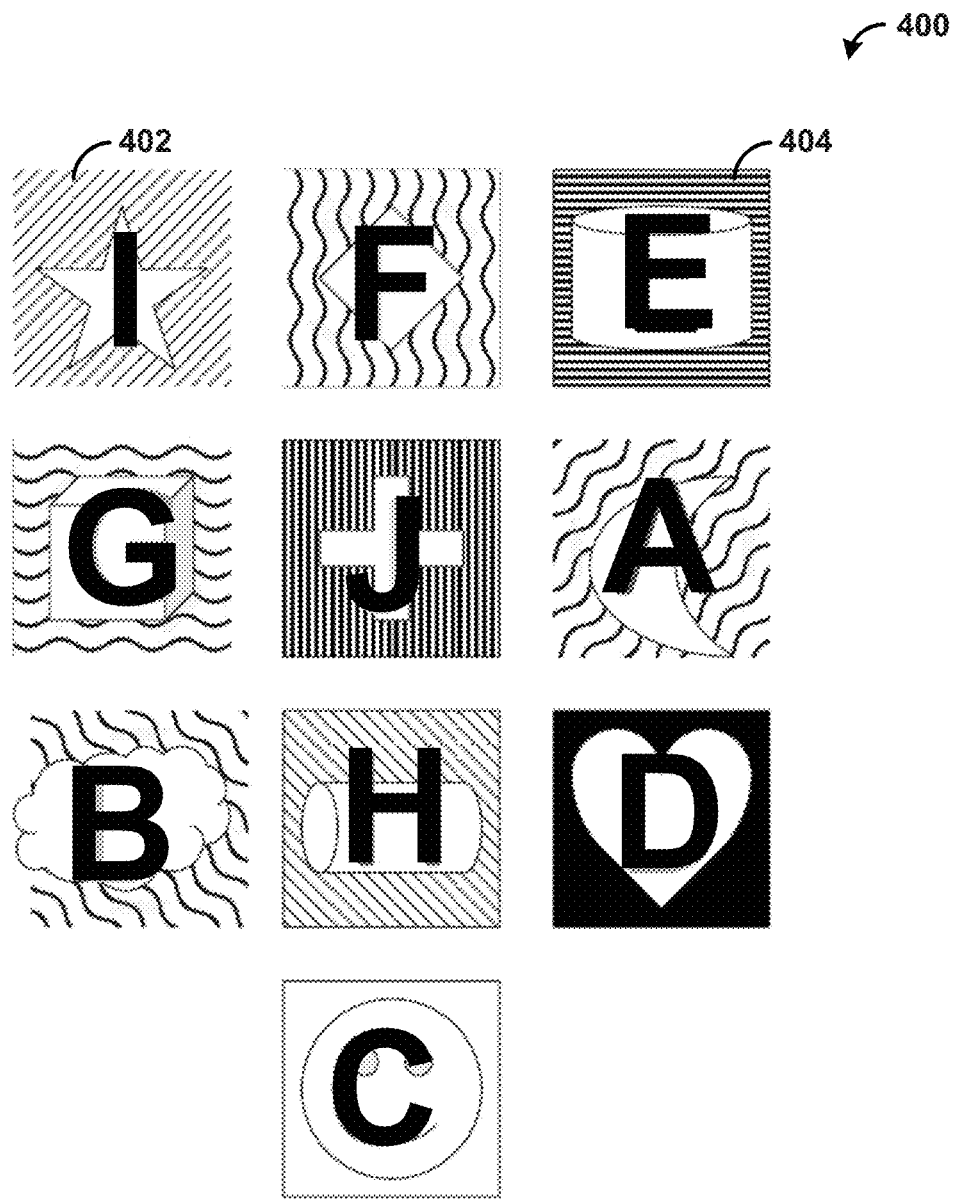
FIG. 4 is an example user interface.

FIG. 4 is an example user interface 400. The user interface 400 includes ten user interface elements each having attribute values for three attributes: "background pattern," "shape," and "letter." Although the user interface 400 shows attribute values for only three attributes per user interface element, it is understood that fewer, more, or different attributes could be included, e.g. color, rotation/motion. For example, the user interface element 402 includes the "upstream" attribute value for the "background pattern" attribute (see column 202 of FIG. 2), the "star" attribute value for the "shape" attribute (see column 204 of FIG. 2), and the "I" attribute value for the "letter" attribute (see column 208 of FIG. 2). As another example, user interface element 404 includes the "river" attribute value for the "background pattern" attribute, the "drum" attribute value for the "shape" attribute, and the "E" attribute value for the "letter" attribute.

The user interface 400 can be generated at least partially randomly. For example, for each user interface element, a respective "background pattern," "shape," and "letter" attribute value can be randomly selected, e.g. from a predefined plurality of attribute values for each attribute. In such an example, the attribute values can be randomly selected without replacement, such that one an attribute value has been selected for a given user interface element, it cannot again be selected for another user interface element. Thus, no attribute value for any attribute is repeated across user interface elements. Additionally, when the quantity of attribute values for a given attribute is equal to the number of user interface elements, each attribute value will be expressed in one of the user interface elements. The various attributes can be graphically overlaid within each key, as in this example, or placed independently, as in a grid, within in each key, or any other way that allows the user to see all attributes simultaneously.

FIG. 5 is a flowchart 500 of an example method. At step 502, a user interface comprising a random placement of user interface elements can be generated (e.g., by a computer 101, a mobile device). The user interface can comprise a keyboard, a number pad, or other interface for inputting alphanumeric and/or special characters. Generating the user interface can comprise determining a random ordering or sequence of user interface elements, e.g., keys. The user interface elements can then be placed according to the random ordering or sequence.

At step 504, a selection of a sequence of user interface elements can be received. The sequence of user interface elements can correspond to a sequence of characters and/or numbers. At step 506, it can be determined that the sequence corresponds to an authentication credential. Determining that the sequence corresponds to the authentication credential can include determining that the sequence of characters or numbers corresponding to the sequence of selected user interface elements matches the authentication credential. The authentication credential can be stored in encrypted form, e.g. hashed, salted. Accordingly, determining that the sequence corresponds to the authentication credential can comprise applying one or more encryption, hashing, salting, or other functions to the sequence of characters or numbers corresponding to the input sequence of user interface elements. The output of the applied functions can then be compared to the stored value for the authentication credential.

At step 508, based on the sequence corresponding to the authentication credential, access to one or more functions (e.g., of the computer 101, of the mobile device) can be granted. For example, a mobile device can be "unlocked."

FIG. 6 is a flowchart of an example method. At step 602, for a plurality of user interface elements, a respective plurality of attribute values can be determined, e.g. by a computer 101, by a mobile device. Determining the respective plurality of attribute values for a given user interface element can comprise determining an attribute value for each of a plurality of attributes. The plurality of attributes can include a shape, background pattern, color, rotation, letter, number, shape, or other attribute that can be expressed in a user interface element. For example, the plurality of attributes can comprise a background pattern, a shape, and a letter. Thus, determining the plurality of attribute values for a user interface element can comprise determining a respective background pattern value, a given shape value, and a given letter.

Determining the respective plurality of attributes for the plurality of user interface elements can be performed at least partially randomly. For example, an attribute value can be determined for a given user interface element by selecting the attribute value from a plurality of attribute values. The attribute value can be selected from the plurality of attribute values without replacement. Thus, an attribute value cannot be selected for a given user interface element if it has already been selected for another user interface element. A quantity of attribute values in the plurality of attribute values from which a given attribute value is selected can equal the number of user interface elements. Thus, if each attribute value is selected without replacement, each attribute value will be selected for a user interface element. Continuing with the previous example where each user interface element comprises a background pattern attribute value, a shape attribute value, and a letter attribute value, assume ten user interface elements. The background pattern attribute, shape attribute, and latter attribute can each correspond to a respective set of ten attribute values.

At step 604 a user interface comprising the plurality of user interface elements can be generated. The user interface can be generated according to a predefined layout or template, such that each user interface element is randomly assigned to a respective layout or template element. The user interface can also be generated by randomly determining positions or coordinates for each of the user interface elements.

At step 606 a selection of a sequence of the user interface elements can be received. For example, the selection of the sequence can comprise one or more user inputs to the user interface. At step 608 it can be determined that the sequence corresponds to an authentication credential. The authentication credential can comprise a sequence of attribute values. Determining that the sequence corresponds to the authentication credential can comprise determining that each attribute value in the sequence of attribute values of the authentication credential is included in a respective user interface element of the sequence of selected user interface elements. For example, assume that the authentication credential comprises a "background pattern" attribute value of "solid," a "shape" attribute value of "moon," a "color" attribute value of "blue," and a "letter" attribute value of "D." Determining that the sequence corresponds to the authentication credential can then comprise determining that the first selected user interface element comprises a "solid" attribute value, determining that the second selected user interface element comprises a "moon" attribute value," determining that the third selected user interface element comprises a "blue" attribute value, and determining that the fourth selected user interface element comprises a "D" attribute value.

The authentication credential can be stored according to numerical encodings of its attribute values. For example, the authentication credential comprising four attribute values can be stored as a four-byte array, with each byte corresponding to a respective attribute value. For example, using the table 200 of FIG. 2, the example authentication credential "solid, moon, blue, D" can be stored as an ordered sequence of values {10, 21, 32, 43}. Determining that the sequence corresponds to the authentication credential can comprise determining a numerical encoding for each attribute value in each of the selected user interface elements in the sequence. It can then be determined whether the numerical encoding of each attribute value in the authentication credential is represented in the numerical encodings for the corresponding selected user interface elements. For example, given the authentication credential having the numerical encoding {10, 21, 32, 43}, it can be determined whether the first selected user interface element includes a "10" numerical encoding, whether the second selected user interface element includes a "21" numerical encoding, whether the third selected user interface element includes a "32" numerical encoding, and whether the fourth selected user interface element includes a "43" numerical encoding.

At step 610, based on the sequence corresponding to the authentication credential, access to one or more functions (e.g., of the computer 101, of the mobile device) can be granted. For example, a mobile device can be "unlocked."

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    generating, on a user device, a user interface comprising a plurality of user interface elements, wherein each user interface element, of the plurality of user interface elements, comprises a plurality of attributes;
    receiving, via the user interface, based on user interactions with one or more user interface elements of the plurality of user interface elements, a selection of a sequence of user interface elements of the plurality of user interface elements, wherein each user interface element selection of the one or more user interface elements, of the sequence of user interface elements, comprises at least one attribute, of the plurality of attributes, associated with an authentication credential and at least one attribute, of the plurality of attributes, not associated with the authentication credential;
    determining that the sequence of user interface elements comprises a sequence of attributes associated with the authentication credential; and
    granting, based on the authentication credential, access to one or more functions of the user device.

2. The method of claim 1, wherein the plurality of attributes comprises one or more of: a number, a letter, a color, or an image pattern.

3. The method of claim 1, wherein determining that the sequence of user interface elements comprises the sequence of attributes associated with the authentication credential comprises determining, based on comparing a sequence of attributes associated with the sequence of user interface elements to a sequence of attributes associated with a stored authentication credential, that the sequence of user interface elements comprises the sequence of attributes associated with the authentication credential.

4. The method of claim 3, wherein comparing the sequence of attributes associated with the sequence of user interface elements to the sequence of attributes associated with the authentication credential comprises comparing a first numerical encoding of the sequence of attributes associated with the sequence of user interface elements to a second numerical encoding of the sequence of attributes in the authentication credential.

5. The method of claim 1, wherein the authentication credential is stored as a numerical encoding of the sequence of attributes associated with the authentication credential.

6. The method of claim 1, wherein the user device comprises a mobile device.

7. The method of claim 1, wherein generating the user interface comprises generating a random placement of the plurality of user interface elements.

8. An apparatus, comprising:
    one or more processors; and
    a memory storing processor executable instructions that, when executed by the one or more processors, cause the apparatus to:
        generate, on a user device, a user interface comprising a plurality of user interface elements, wherein each user interface element, of the plurality of user interface elements, comprises a plurality of attributes;
        receive, via the user interface, based on user interactions with one or more user interface elements of the plurality of user interface elements, a selection of a sequence of user interface elements of the plurality of user interface elements, wherein each user interface element selection of the one or more user interface elements, of the sequence of user interface elements, comprises at least one attribute, of the plurality of attributes, associated with an authentication credential and at least one attribute, of the plurality of attributes, not associated with the authentication credential;

determine that the sequence of user interface elements comprises a sequence of attributes associated with the authentication credential; and grant, based on the authentication credential, access to one or more functions of the user device.

9. The apparatus of claim 8, wherein the plurality of attributes comprises one or more of: a number, a letter, a color, or an image pattern.

10. The apparatus of claim 8, wherein the processor executable instructions that, when executed by the one or more processors, cause the apparatus to determine that the sequence of user interface elements comprises the sequence of attributes associated with the authentication credential, further cause the apparatus to:

determine, based on comparing the sequence of attributes associated with the sequence of user interface elements to a sequence of attributes associated with a stored authentication credential, that the sequence of user interface elements comprises the sequence of attributes associated with the authentication credential.

11. The apparatus of claim 10, wherein the processor executable instructions that, when executed by the one or more processors, cause the apparatus to compare the sequence of attributes associated with the sequence of user interface elements to the sequence of attributes associated with the stored authentication credential, further cause the apparatus to compare a first numerical encoding of the sequence of attributes associated with the sequence of user interface elements to a second numerical encoding of the corresponding sequence of attributes in the authentication credential.

12. The apparatus of claim 8, wherein the authentication credential is stored as a numerical encoding of the sequence of attributes.

13. The apparatus of claim 8, wherein the processor executable instructions that, when executed by the one or more processors, cause the apparatus to generate the user interface further cause the apparatus to generate a random placement of the plurality of user interface elements.

14. A method comprising:
generating, on a user device, a user interface comprising a plurality of user interface elements, wherein each user interface element, of the plurality of user interface elements, comprises a plurality of attributes;

receiving, via the user interface, based on user interactions with the plurality of user interface elements, a selection of a sequence of user interface elements of the plurality of user interface elements wherein each user interface element selection of the one or more user interface elements, of the sequence of user interface elements, comprises at least one attribute, of the plurality of attributes, associated with an authentication credential and at least one attribute, of the plurality of attributes, not associated with the authentication credential;

determining that the sequence of user interface elements comprises a sequence of attributes not associated with the authentication credential; and denying, based on the sequence of user interface elements, access to one or more functions of the user device.

15. The method of claim 14, wherein the plurality of user interface elements comprises a plurality of numerical keypad keys or a plurality of alphanumeric keyboard keys.

16. The method of claim 14, wherein the user interface is generated in response to a first input to the user device, wherein the method further comprises:
receiving a second input to the user device; and
generating the user interface comprising a second placement of the plurality of user interface elements.

17. The method of claim 14, wherein the user device comprises a mobile device.

18. An apparatus, comprising:
one or more processors; and
a memory storing processor executable instructions that, when executed by the one or more processors, cause the apparatus to:
generate a user interface comprising a plurality of user interface elements, wherein each user interface element, of the plurality of user interface elements, comprises a plurality of attributes;

receive, via the user interface, based on user interactions with one or more user interface elements of the plurality of user interface elements, a selection of a sequence of user interface elements of the plurality of user interface elements, wherein each user interface element selection of the one or more user interface elements, of the sequence of user interface elements, comprises at least one attribute, of the plurality of attributes, associated with an authentication credential and at least one attribute, of the plurality of attributes, not associated with the authentication credential;

determine that the sequence of user interface elements comprises a sequence of attributes not associated with the authentication credential; and deny, based on the sequence of user interface elements, access to one or more functions of a user device.

19. The apparatus of claim 18, wherein the plurality of user interface elements comprises a plurality of numerical keypad keys or a plurality of alphanumeric keyboard keys having a random placement.

20. The apparatus of claim 18, wherein the processor executable instructions, when executed by the one or more processors, further cause the apparatus to generate the user interface in response to a first input to the user device, and wherein the processor executable instructions, when executed by the one or more processors, further cause the apparatus to:
receive a second input to the user device; and
generate the user interface comprising the plurality of user interface elements, wherein the plurality of user interface elements have an updated random placement.

* * * * *